United States Patent
Drake et al.

(10) Patent No.: US 7,470,484 B2
(45) Date of Patent: Dec. 30, 2008

(54) FUEL SOURCES, FUEL CELLS AND METHODS OF OPERATING FUEL CELLS

(75) Inventors: Javit A. Drake, Waltham, MA (US); Anna Maria Bofinger, Nashua, NH (US); Andrew G. Gilicinski, Westborough, MA (US); In Tae Bae, Wrentham, MA (US)

(73) Assignee: The Gillette Company, Boston, MA (US)

( * ) Notice: Subject to any disclaimer, the term of this patent is extended or adjusted under 35 U.S.C. 154(b) by 708 days.

(21) Appl. No.: 10/957,935

(22) Filed: Oct. 4, 2004

(65) Prior Publication Data

US 2006/0073371 A1 Apr. 6, 2006

(51) Int. Cl.
*H01M 2/02* (2006.01)

(52) U.S. Cl. ........................................ 429/34
(58) Field of Classification Search .................... 429/34
See application file for complete search history.

(56) References Cited

U.S. PATENT DOCUMENTS 7,255,947 B2 * 8/2007 Becerra et al. ................ 429/13

| | | | |
|---|---|---|---|
| 2001/0049045 A1 | 12/2001 | Hockaday et al. | |
| 2002/0064698 A1 | 5/2002 | Ren | |
| 2002/0197522 A1 * | 12/2002 | Lawrence et al. | 429/13 |
| 2005/0023236 A1 * | 2/2005 | Adams et al. | 215/3 |

FOREIGN PATENT DOCUMENTS

JP 03152193 6/1991

OTHER PUBLICATIONS

Noveon Inc. et al., "Methanol Solid Fuel Gel/Fire Starter", Retrieved from the Internet: http:www.homecare.noveoninc.com/form, Rev. 2/01.
Kujawski, "Pervaporative Removal of Organics from Water Using Hydrophobic Membranes. Binary Mixtures", Separation Science and Technology, 35(1), pp. 89-108, 2000.

* cited by examiner

*Primary Examiner*—Mark Ruthkosky
*Assistant Examiner*—Karie O'Neill
(74) *Attorney, Agent, or Firm*—Fish & Richardson P.C.

(57) ABSTRACT

Fuel sources, fuel cells and methods of operating fuel cells are disclosed. In one aspect, the invention features a fuel source for a fuel cell, including a housing made substantially from a fuel-permeable material, and a fuel in the housing.

23 Claims, 6 Drawing Sheets

FUEL SOURCES, FUEL CELLS AND METHODS OF OPERATING FUEL CELLS

FIELD OF THE INVENTION

The invention relates to fuel sources, fuel cells and methods of operating the cells.

BACKGROUND

A fuel cell is a device capable of providing electrical energy from an electrochemical reaction, typically between two or more reactants. Generally, a fuel cell includes two electrodes, called an anode and a cathode, and a solid electrolyte disposed between the electrodes. The anode contains an anode catalyst, and the cathode contains a cathode catalyst. The electrolyte, such as a membrane electrolyte, is typically ionically conducting but electronically non-conducting. The electrodes and solid electrolyte can be disposed between two gas diffusion layers (GDLs).

During operation of the fuel cell, the reactants are introduced to the appropriate electrodes. At the anode, the reactant (s) (the anode reactant(s)) interacts with the anode catalyst and forms reaction intermediates, such as ions and electrons. The ionic reaction intermediates can flow from the anode, through the electrolyte, and to the cathode. The electrons, however, flow from the anode to the cathode through an external load electrically connecting the anode and the cathode. As electrons flow through the external load, electrical energy is provided. At the cathode, the cathode catalyst interacts with the other reactant(s) (the cathode reactant(s)), the intermediates formed at the anode, and the electrons to complete the fuel cell reaction.

For example, in one type of fuel cell, sometimes called a direct methanol fuel cell (DMFC), the anode reactants include methanol and water, and the cathode reactant includes oxygen (e.g., from air). At the anode, methanol is oxidized; and at the cathode, oxygen is reduced:

$$CH_3OH + H_2O \rightarrow CO_2 + 6H^+ + 6e^- \quad (1)$$

$$3/2 O_2 + 6H^+ + 6e^- \rightarrow 3H_2O \quad (2)$$

$$CH_3OH + 3/2 O_2 \rightarrow CO_2 + 2H_2O \quad (3)$$

As shown in Equation (1), oxidation of methanol produces carbon dioxide, protons, and electrons. The protons flow from the anode, through the electrolyte, and to the cathode. The electrons flow from the anode to the cathode through an external load, thereby providing electrical energy. At the cathode, the protons and the electrons react with oxygen to form water (Equation 2). Equation 3 shows the overall fuel cell reaction.

SUMMARY

The invention relates to fuel sources, fuel cells and methods of operating the cells.

In one aspect, the invention features a fuel source for a fuel cell, including a housing made substantially from a fuel-permeable material, and a fuel in the housing.

Embodiments may include one or more of the following features. The fuel-permeable material has a fuel permeability of at least about 0.001 g/hr·cm². The fuel-permeable material has a non-fuel permeability of about $10^{-3}$ g/hr·cm² for liquid non-fuel species or per atm of gaseous non-fuel species or less. The fuel-permeable material includes a plurality of layers. The fuel-permeable material includes a first layer having a fuel permeability different than a fuel permeability of a second layer. The fuel-permeable material includes a first layer having a porosity different than a porosity of a second layer. The fuel-permeable material is selected from the group consisting of a fluorocarbon polymer, a modified polyethylene, a modified polypropylene, a polycarbonate, a polyimide, a polysulfone, a polysulfide, a polyurethane, a polyester, a polysilicone, poly(1-trimethylsilyl-1-propyne), and poly(4-methyl-2-pentene). The fuel-permeable material defines at least about 60%, e.g., at least about 80%, of an exterior surface area of the housing.

The housing can be capable of changing its volume. The housing can include a first layer of fuel-permeable material, and a second layer of fuel-permeable material bonded to the first layer to define a cavity. The housing can include a portion having an initial surface area substantially corresponding to a surface area of an electrode of the fuel cell. The housing can be prismatic or cubic. The housing can consist of the fuel-permeable material. The fuel source can further include a pressure-sensitive valve in fluid communication with an interior of the housing. The housing can define the pressure-sensitive valve. The housing can include a preferential folding portion.

The fuel can be in the form of a liquid or a gel. The fuel can include methanol.

In another aspect, the invention features a fuel source for a methanol-powered fuel cell, including a collapsible housing made solely from a fuel-permeable, non-fuel impermeable material, and a fuel in the housing, the fuel comprising methanol.

Embodiments may include one or more of the following features. The fuel-permeable, non-fuel impermeable material has a fuel permeability of at least about 0.001 g/hr·cm². The fuel-permeable, non-fuel impermeable material has a non-fuel permeability of about $10^{-3}$ g/hr·cm² for liquid non-fuel species or per atm of gaseous non-fuel species or less. The fuel-permeable, non-fuel impermeable material is selected from the group consisting of a fluorocarbon polymer, a modified polyethylene, a modified polypropylene, a polycarbonate, a polyimide, a polysulfone, a polysulfide, a polyurethane, a polyester, a polysilicone, poly(1-trimethylsilyl-1-propyne), and poly(4-methyl-2-pentene). The fuel source of claim 21, wherein the housing comprises a portion having an initial surface area substantially corresponding to a surface area of an electrode of the fuel cell. The fuel source further includes a pressure-sensitive valve in fluid communication with an interior of the housing. The housing includes a preferential folding portion. The fuel-permeable, non-fuel impermeable material includes a plurality of layers.

The fuel can be in the form of a liquid or a gel.

In another aspect, the invention features a fuel cell system, including a fuel cell comprising an anode, a cathode, and an electrolyte, a fuel source configured to interface with the fuel cell, the fuel source comprising a collapsible housing made substantially from a fuel permeable, non-fuel impermeable material, and a fuel in the housing.

Embodiments may include one or more of the following features. The fuel-permeable, non-fuel impermeable material has a fuel permeability of at least about 0.001 g/hr·cm², and a non-fuel permeability of about $10^{-2}$ g/hr·cm² for liquid non-fuel species or per atm of gaseous non-fuel species or less. The fuel-permeable, non-fuel impermeable material is selected from the group consisting of a fluorocarbon polymer, a modified polyethylene, a modified polypropylene, a polycarbonate, a polyimide, a polysulfone, a polysulfide, a polyurethane, a polyester, a polysilicone, poly(1-trimethylsilyl-1-propyne), and poly(4-methyl-2-pentene). The housing includes a portion having an initial surface area substantially corresponding to a surface area of the anode of the fuel cell. The housing consists of the fuel-permeable, non-fuel impermeable material. The system further includes a pressure-sensitive valve in fluid communication with an interior of the housing. The fuel includes methanol in the form of a liquid or a gel. The system further includes a support configured to support the fuel source and to engage with the fuel cell.

In another aspect, the invention features a method of operating a fuel cell, including contacting an anode of the fuel cell with a fuel from a housing made substantially from a fuel permeable, non-fuel impermeable material.

Embodiments may include one or more of the following features. The method further includes collapsing the housing. The method further includes collapsing the housing along a preferential folding portion. The method further includes venting pressure from the housing.

Other aspects, features, and advantages will be apparent from the drawing, description, and claims.

DETAILED DESCRIPTION OF THE PREFERRED EMBODIMENTS

Figure 1:
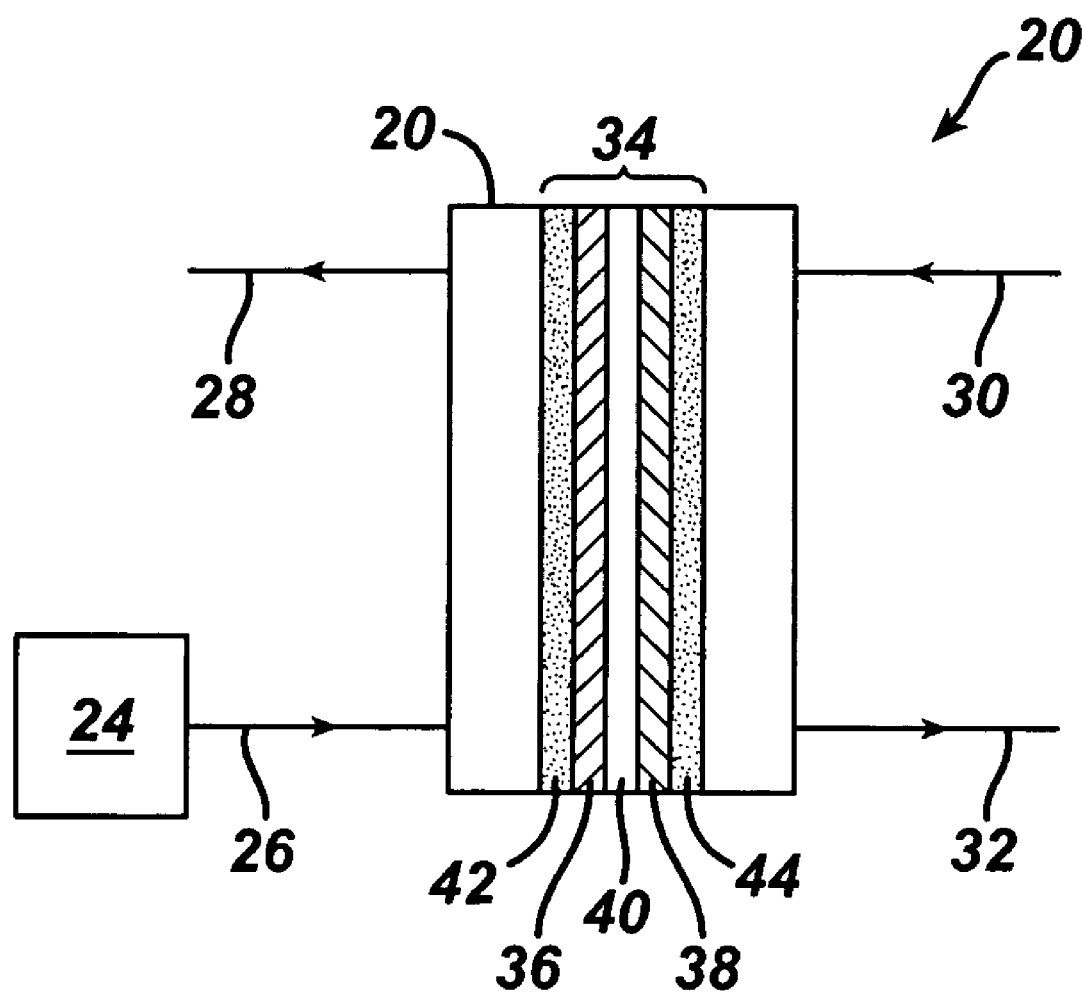
FIG. 1 is a schematic diagram of an embodiment of a fuel cell system.

Referring to FIG. 1, a fuel cell system 20, such as, a direct methanol fuel cell (DMFC) system, is shown. Fuel cell system 20 includes a fuel cell stack 22; a fuel system 24 in fluid communication with the fuel cell stack via a fuel inlet 26; a fuel outlet 28; a cathode reactant (e.g., air) inlet 30 in fluid communication with the fuel cell stack; and a cathode reactant outlet 32. For clarity, fuel cell stack 22 is shown having one fuel cell 34 (described below), but in other embodiments, the fuel cell stack includes a plurality of fuel cells, e.g., arranged in series or in parallel. Briefly, fuel cell 34 includes an anode 36, a cathode 38, and an electrolyte 40 between the anode and the cathode. Fuel cell 34 further includes two gas diffusion layers (GDL) 42 and 44, one disposed on each side of the electrolyte 40, anode 36, and cathode 38 assembly.

Figure 2:
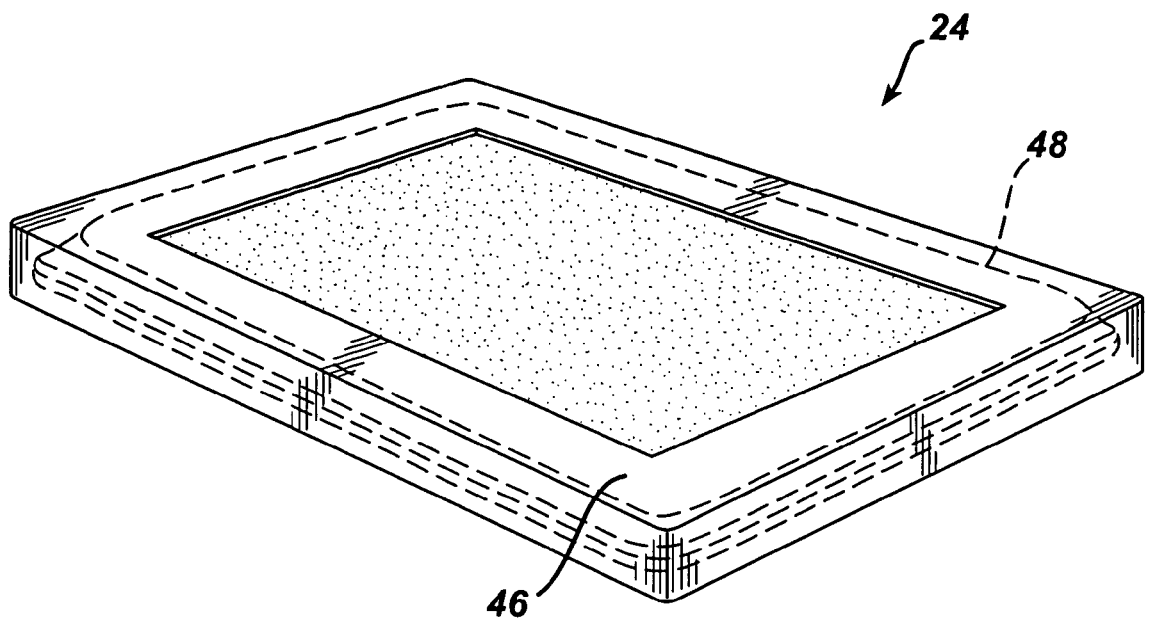
FIG. 2 is a perspective illustration of an embodiment of a fuel cartridge including a fuel source and a support.
Figure 3:
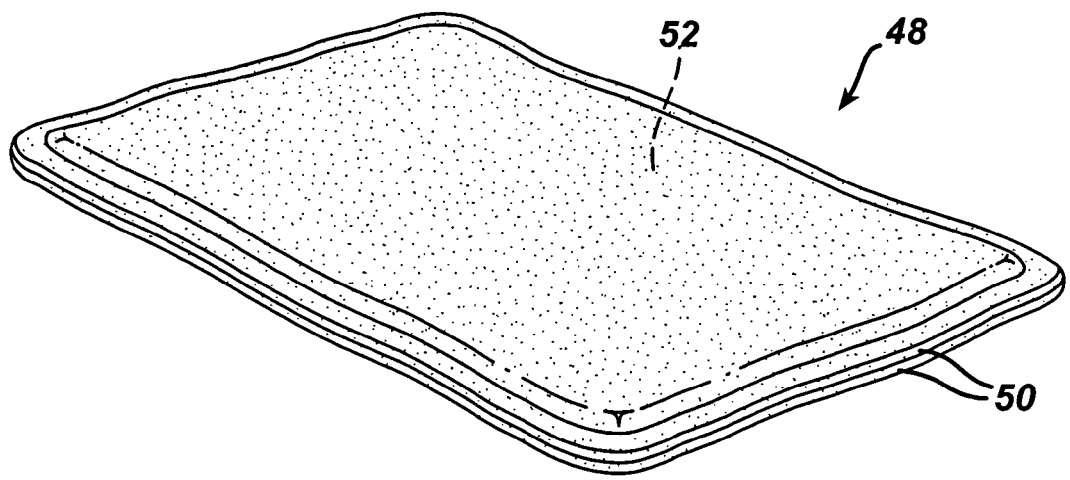
FIG. 3 is a perspective illustration of an embodiment of a fuel source.

Referring to FIG. 2, fuel system 24 is configured to deliver a vapor phase fuel to fuel cell stack 22. As shown, fuel system 24 includes a support member 46 (e.g., a cartridge) and a fuel source 48 contained by the support member. Referring also to FIG. 3, fuel source 48 includes one or more (as shown, two) substantially fuel permeable membranes 50 that define an enclosed housing, and a fuel 52 (e.g., a fuel including methanol) in the housing. The membranes 50 are flexible and deformable, which allows fuel source 48 to deform during use as fuel 52 permeates through the membranes and flows to fuel cell 34 for reaction. More specifically, fuel source 48 is capable of collapsing in volume as fuel 52 is depleted during use, which can enhance the performance of fuel cell system 20.

For example, since fuel source 48 is capable of collapsing during use, adverse effects from a membrane expanding toward an anode can be reduced. In some embodiments of fuel cell systems, fuel system 24 interfaces with a fuel cell stack or a fuel cell such that a membrane is spaced and adjacent to an anode. By allowing fuel source 48 to collapse, for example, such that the membrane does not expand toward or contact the anode, the space between the anode and the membrane, which can be sensitively associated with the performance of the fuel cell system, is substantially maintained. In addition, maintaining the space between the anode and the membrane can reduce entrapment of condensed fluid (e.g., water) between the anode and the membrane, which can also be detrimental to fuel cell performance.

The ability of fuel source 48 to deform can also reduce the dependence of the performance of the fuel source on the orientation of the fuel source and/or fuel cell system 20. For example, referring to FIG. 2, as fuel 52 is consumed during use, fuel source 48 is capable of self-folding or reducing in volume such that membrane 50 remains in contact with the fuel. As a result, the diffusion (e.g., permeation) of fuel 52 through membrane 50 and to fuel cell 34 can remain relatively steady because the interface between the fuel and the membrane can remain unchanged during fuel consumption. The fuel delivery rate is also enhanced by allowing the surface area of fuel 52 to contact fuel permeable membrane(s) 50, compared to, for example, having the fuel spaced from the membrane(s) by a gas volume. In addition, the performance of fuel source 48 can be independent of its orientation because, regardless of how the fuel source is oriented, fuel 52 remains in contact with membrane 50, which can conform to the volume of the fuel. The ability of fuel source 48 to operate predictably and uniformly, independent of its orientation, provides the fuel source with the versatility to be used in devices that may be moved or reoriented during use.

In comparison, if membrane 50 of the fuel source 48 permits permeation of external non-fuel species and the fuel source does not collapse during fuel consumption, then a gas volume (e.g., a gas bubble) can be created in the fuel source as fuel 52 diffuses out of the fuel source and gas diffuses into the fuel source. The gas volume can affect performance of the fuel source, depending on how the fuel source is oriented relative to the fuel cell. For example, still referring to FIG. 2, if the fuel cell is below the fuel source (as shown in FIG. 2), then fuel diffusion is from fuel 52, through membrane 50, and to the fuel cell. If the fuel cell is above the fuel source (as shown in FIG. 2), then fuel diffusion is from fuel 52, through a gas volume (assuming the gas volume is less dense than the fuel), through membrane 50, and to the fuel cell. If the fuel cell is to the side of the fuel source (as shown in FIG. 2), then, depending on the size of the gas volume, fuel diffusion from fuel 52 to the fuel cell may be affected by the gas volume. In particular, if the gas volume contacts the portion of membrane 50 adjacent to the fuel cell, then fuel diffusion can be affected by the gas volume since the gas volume is in the diffusion path of the fuel to the fuel cell. Thus, the presence of a gas volume in a fuel source can vary the performance of the fuel source as a function of its orientation.

As indicated above, membrane 50 is substantially fuel permeable. A relatively high fuel permeability can provide a high fuel delivery rate. Also, by forming fuel source 48 substantially of membrane(s) 50, fuel 52 can contact a relatively high surface area of a fuel permeable material, which can further enhance fuel delivery rates. In some embodiments, membrane 50 has a fuel permeability of about 0.001 g/hr·cm$^2$ to about 2 g/hr·cm$^2$ at 30° C. For example, the fuel permeability can be greater than or equal to about 0.001, 0.05, 0.10, 0.25, 0.50, 0.75, 1.00, 1.25, 1.50, or 1.75 g/hr·cm$^2$ at 30° C.; and/or less than or equal to about 2, 1.75, 1.50, 1.25, 1.00, 0.75, 0.50, 0.25, 0.10, or 0.05 g/hr·cm$^2$ at 30° C.

In addition, in some embodiments, membrane 50 is substantially non-fuel impermeable. The non-fuel impermeability of membrane 50 restricts non-fuels from penetrating into fuel source 48, thereby diluting fuel 52 and/or expanding the fuel source, both of which can reduce fuel cell performance. Examples of non-fuels include components of any residual air (e.g., nitrogen and oxygen), anodically generated carbon dioxide, and water. Membrane 50 can have a non-fuel permeability of about $1\times10^{-3}$ g/hr·cm$^2$ for liquid non-fuels (or per atm pressure of gaseous non-fuel species) or less, e.g., less than about $1\times10^{-4}$ g/hr·cm$^2$, less than about $1\times10^{-5}$ g/hr·cm$^2$, or less than about $1\times10^{-6}$ g/hr·cm$^2$. A carbon dioxide permeability of substantially less than $4\times10^{-5}$ g-CO$_2$/hr·cm$^2$atm-CO$_2$, for example, can prevent formation of a bubble during discharge of a 20% efficient methanol fuel cell operating at 30 mW/cm$^2$ with equal membrane area and electrode area.

Membrane 50 can include (e.g., be formed wholly of) polymers. Examples of polymers include fluorocarbon polymers, modified polyethylenes (e.g., grafted polyethylenes), modified polypropylenes (e.g., grafated polypropylenes), polycarbonates, polyimides, polysulfones, polysulfides, polyurethane, polyesters, and polysilicones. Specifically, polydimethylsilicone (PDMS) and poly(trimethyl) silyl propynes (PTMSP) can provide high fuel delivery rates with relatively low non-fuel uptake. Polyurethanes (e.g., one-mil thick from Deerfield Urethane, Inc. (Whately, Mass.)) can provide a high delivery rate, the ability to flex or collapse during fuel discharge, and a low gas permeability. In addition, the material can be amenable to thermal bonding, which can be used to fabricate fuel source 48. In some embodiments, the polymer(s) can be porous, for example, having a connected, continuous network of pores to allow fuel transport.

In some embodiments, membrane 50 can include one or more additives to enhance the performance of the membrane. For example, a membrane including a polymer can include an additive that can plasticize the polymer or provide other mechanical properties to enhance construction (e.g., fabrication and handling) of fuel source 48. Examples of additives include high molecular weight (non-volatile) glycols and other plasticizer additives capable of influencing mechanical properties to enable flexibility and ease of manufacture. In other embodiments, having no additives can enhance fuel diffusion (e.g., pervaporation) through membrane 50.

In some embodiments, membrane 50 can include a non-polymer. For example, membrane 50 can include a cellulose, such as paper. Other examples include porous membranes that are fuel permeable, for example, including metal sheets, metal foils, such as sintered 316 stainless steel membranes by the Mott Corporation, Farmington, Conn., or carbon layers.

The total thickness of membrane 50 can be a function of, for example, the particular material(s) of the membrane, the targeted fuel permeability, the targeted non-fuel impermeability, and/or the targeted fuel cell performance. In some embodiments, a lower bound for thickness is selected to provide a uniform and substantially defect-free (e.g., substantially free of holes) membrane. An upper bound for thickness exists because of volumetric considerations (e.g., to maximize the amount of fuel that can be stored in a given volume), and to provide flexibility so that the membrane collapse as the fuel is depleted. Membrane 50 can have a total thickness of about 100 nanometers to about 200 micrometers.

Membrane 50 can include one homogeneous material or multiple layers of one material or different materials. As an example, a composite membrane structure can include a relatively porous portion including PTMSP (e.g., as the main layer in terms of thickness), and a relatively dense portion including PTMSP (e.g., a layer deposited on the main layer) to provide selectivity for methanol instead of water. A composite membrane structure is capable of imparting selectivity into membrane 50, which can be beneficial for reducing the impact that water permeation into fuel source 48 can have on methanol activity and thus fuel delivery rate. Porous and dense polymers, such as PTMSP, are commercially available from Membrane Technology Research, Inc. (Menlo Park, Calif.). Examples of composite membrane structures are described, for example, in "Membrane Technology in the Chemical Industry" S. P. Nunes and K.-V. Peinemann, Eds., Wiley-VCH, 2001, pp. 149-151.

Figure 4:
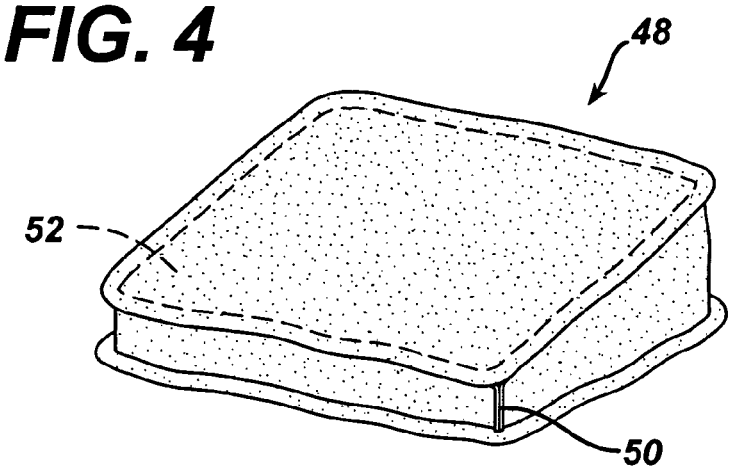
FIG. 4 is a perspective illustration of an embodiment of a prismatic fuel source.
Figure 5:
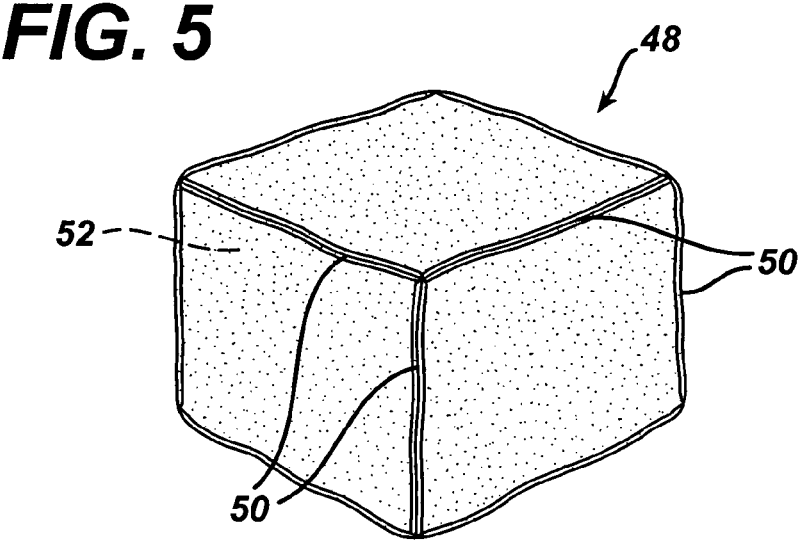
FIG. 5 is a perspective illustration of an embodiment of a cubic fuel source.
Figure 6:
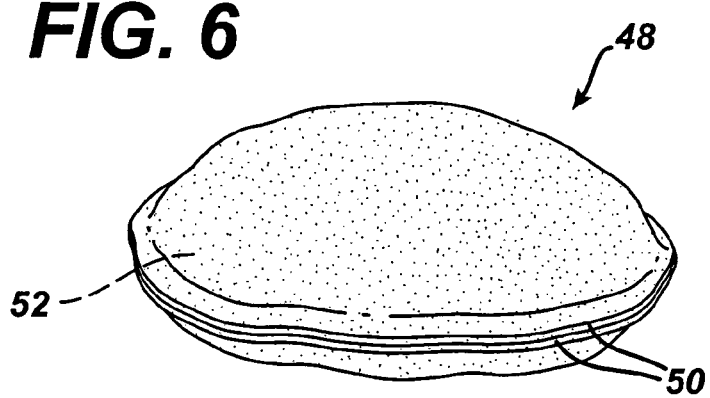
FIG. 6 is a perspective illustration of an embodiment of a round fuel source.

Fuel source 24 can be formed by bonding two or more membranes 50 together to form a housing. For example, membranes 50 can be bonded together using an adhesive or by heat sealing (such as hot plate pressing, melting around a mold, and/or laser bonding). The housing can be formed in any shape configured for use with an intended fuel cell system. For example, referring to FIGS. 4-6, a fuel source 24 can include multiple membranes 50 bonded together to form a prismatic structure (FIG. 4), a cubic structure (FIG. 5), or a round structure (FIG. 6). In some embodiments, the housing can include one unitary membrane 50, e.g., formed by injection molding.

The housing can consist solely of membrane(s) 50, or the housing can be made partially from the membrane(s). The latter option can be used to prevent fuel permeation in every external direction from fuel source 48. For example, one or more walls of fuel source 48 may be obstructed by a portion of an external cartridge housing or by an arrangement within the fuel cell system. The external obstruction may prevent locally permeated fuel vapor from reaching the anode. Thus, to prevent fuel permeation from fuel source 48 to an inaccessible area, one or more sections of the fuel source can be fabricated from a material impermeable to fuel and non-fuel species. Furthermore, if the material is flexible, the non-permeable section(s) can provide or contribute to the ability of fuel source 48 to collapse. In some embodiments, at least about 25% (e.g., at least about 30%, at least about 40%, at least about 50%, at least about 60%, at least about 70%, at least about 80%, or at least about 90%) of the surface area of the housing is defined by membrane(s) 50. The remaining surface area of the housing can be defined by the material chosen to be substantially impermeable to fuel and non-fuel species and perhaps flexible, such as polyethylene, polypropylene, and modified copolymers of these or other materials.

Figure 7:
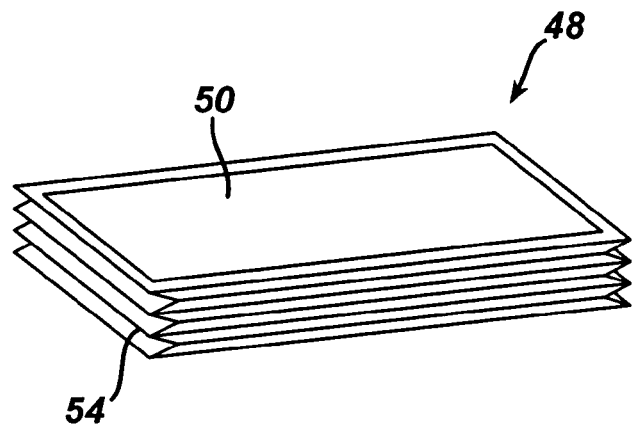
FIG. 7 is a perspective illustration of an embodiment of a fuel source having preferential folding lines.

In some embodiments, referring to FIG. 7, fuel source 48 includes one or more preferential folding portions 54 (as shown, crease lines) formed in membrane 50. Preferential folding portions 54 enhance volume shrinking of fuel source 48 by allowing the fuel source to collapse in a predetermined manner, e.g., while maintaining a substantially fixed fuel permeation active area during the life of the fuel source.

Preferential folding portions 54 can be formed by removing portions of membrane 50, for example, by mechanically weakening, thinning (e.g., with an excimer laser), and/or by scribing.

After the housing is formed, fuel 52, which is capable of providing fuel in gaseous form to fuel cell stack 22, can be placed in (e.g., injected into) the housing. Fuel 52, such as one including an alcohol (e.g., methanol and/or ethanol) or a hydrocarbon, can be in the form of a liquid or a gel (e.g., non-gaseous form) having a vapor pressure sufficient to provide gaseous fuel to stack 22. A fuel gel is a viscous material (e.g., from about 0.05 to about 200,000 centipoises) capable of emitting a pure and high concentration of gas-phase fuel molecules. The viscosity can be, for example, greater than or equal to about 10,000, 25,000, 50,000, 100,000, or 150,000 centipoises; and/or less than or equal to about 200,000, 150,000, 100,000, 50,000, or 25,000 centipoises. An example of a fuel gel composition includes a fuel (e.g., methanol); a diluent (e.g., deionized water); a thickener (e.g., Carbopol EZ-3, an acidic, hydrophobically-modified, cross-linked polyacrylate powder); and a neutralizing agent (e.g., tri-isopropanolamine). Other fuel gels are described in literature from Noveon that describe examples of the use of Carbopol rheology modifiers (manufactured by BF Goodrich); and exemplified by cooking fuels (e.g., available from Sterno, and formulation examples listed by Noveon). A liquid fuel can include pure methanol, or a solution including methanol and water and/or gelling agent as non-fuel components. Fuel 52 can include additives, such as ethanol, ethylene glycol, and/or formic acid, and fuel components. In some embodiments, fuel 52 contains greater than about 90% by weight of methanol to maximize delivery rate and to minimize excess non-fuel volume and mass, but greater than about 20% by weight of non-fuel component(s) can be used to power a fuel cell.

Figure 8:
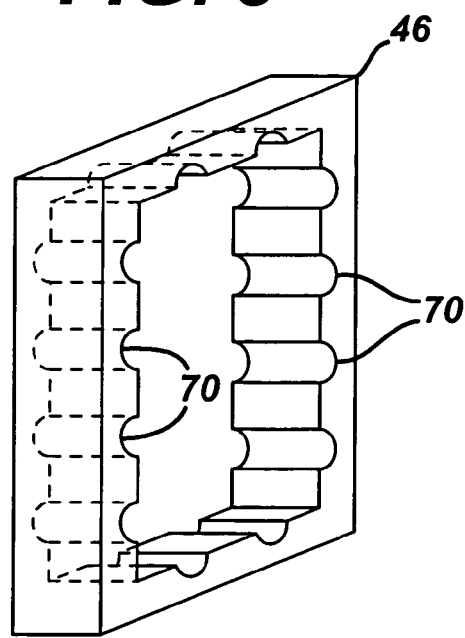
FIG. 8 is a perspective illustration of an embodiment of a support member.
Figure 9:
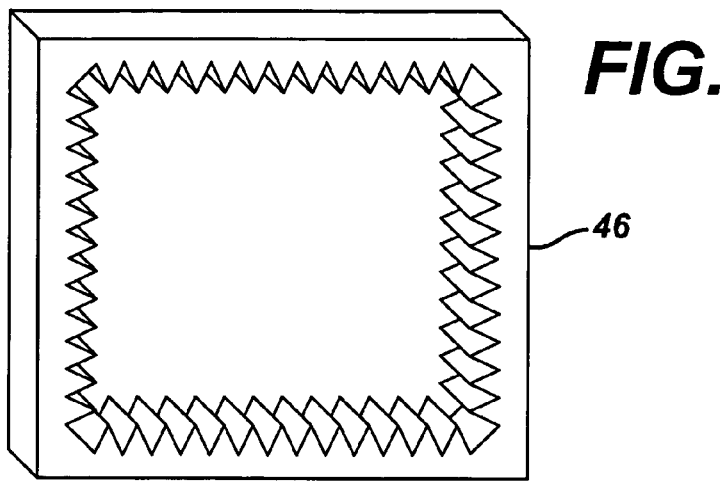
FIG. 9 is a perspective illustration of an embodiment of a support member.

Support member 46 can be of any shape configured to support fuel source 48 and to interface with an intended fuel cell system. For example, as shown in FIG. 2, support member 46 can be replaceable cartridge that can engage with (e.g., snap fit to) to a fuel cell system. In other embodiments, referring to FIG. 8, support member 46 can include one or more channels 70 that provide fluid communication between where the support member is adjacent to (e.g., contacts) fuel source 48 and where the support member is adjacent to the fuel cell. Channels 70 provide a diffusion path between the fuel cell and portions of fuel source 48 that would otherwise be blocked by support member 46 (e.g., the sidewalls of the support member). Alternatively or additionally, referring to FIG. 9, to enhance fuel delivery from the sides of fuel source 48, portions of support member 46 engaging the fuel source (e.g., the interior side walls) can be jagged, with the edges smoothed to prevent the fuel source from getting punctured.

Referring again to FIG. 1, an example of fuel cell 34 will now be described. Fuel cell 34 includes electrolyte 40, anode 36 bonded on a first side of the electrolyte, and cathode 38 bonded on a second side of the electrolyte. Electrolyte 40, anode 36, and cathode 38 are disposed between gas diffusion layers (GDLs) 42 and 44.

Electrolyte 40 should be capable of allowing ions to flow therethrough while providing a substantial resistance to the flow of electrons. In some embodiments, electrolyte 40 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 40 can also be prepared from the commercial product GORE-SELECT, available from W.L. Gore & Associates (Elkton, Md.).

Anode 36 can be formed of a material, such as a catalyst, capable of interacting with methanol and water to form carbon dioxide, protons and electrons. Examples of such materials include, for example, platinum, platinum alloys (such as Pt—Ru, Pt—Mo, Pt—W, or Pt—Sn), platinum dispersed on carbon black. Anode 36 can further include an electrolyte, such as an ionomeric material, e.g., NAFION, that allows the anode to conduct protons. Alternatively, a suspension is applied to the surfaces of gas diffusion layers (described below) that face solid electrolyte 40, and the suspension is then dried. The method of preparing anode 36 may further include the use of pressure and temperature to achieve bonding.

Cathode 38 can be formed of a material, such as a catalyst, capable of interacting with oxygen, electrons and protons to form water. Examples of such materials include, for example, platinum, platinum alloys (such as Pt—Co, Pt—Cr, or Pt—Fe) and noble metals dispersed on carbon black. Cathode 38 can further include an electrolyte, such as an ionomeric material, e.g., NAFION, that allows the cathode to conduct protons. Cathode 38 can be prepared as described above with respect to anode 36.

Gas diffusion layers (GDLs) 42 and 44 can be formed of a material that is both gas and liquid permeable. Examples of GDLs are available from various companies such as Etek in Natick, Mass., SGL in Valencia, Calif., and Zoltek in St. Louis, Mo. GDLs 42 and 44 can be electrically conductive so that electrons can flow from anode 36 to an anode flow field plate (not shown) and from a cathode flow field plate (not shown) to cathode 38.

Other embodiments of direct methanol fuel cells and fuel cell systems, including methods of use, are described, for example, in commonly assigned U.S. Ser. No. 10/779,502, filed Feb. 13, 2004, and entitled "Fuel Cell"; "Fuel Cell Systems Explained", J. Laraminie, A. Dicks, Wiley, New York, 2000; "Direct Methanol Fuel Cells: From a Twentieth Century Electrochemist's Dream to a Twenty-first Century Emerging Technology", C. Lamy, J. Leger, S. Srinivasan, Modem Aspects of Electrochemistry, No. 34, edited by J. Bockris et al., Kluwer Academic/Plenum Publishers, New York (2001) pp. 53-118; and "Development of a Miniature Fuel Cell for Portable Applications", S. R. Narayanan, T. I. Valdez and F. Clara, in Direct Methanol Fuel Cells, S. R. Narayanan, S. Gottesfeld and T. Zawodzinski, Editors, Electrochemical Society Proceedings, 2001-4 (2001) Pennington, N.J., all hereby incorporated by reference.

During operation of fuel cell system 20, fuel 52 from fuel system 24 is introduced to anode 36, a cathode reactant (such as air) is introduced to cathode 38, and electrical energy is produced from the respective oxidation and reduction reactions as described above. In particular, as fuel 52 evaporates and permeates through membrane(s) 50, and diffuses to anode 36, fuel source 48 deforms to the decreasing volume of the fuel. This deformation can enhance the performance of fuel cell system 20 by allowing fuel 52 to be delivered in a uniform manner with reduced or no orientation dependence.

While certain embodiments have been described, the invention is not so limited.

Figure 10:
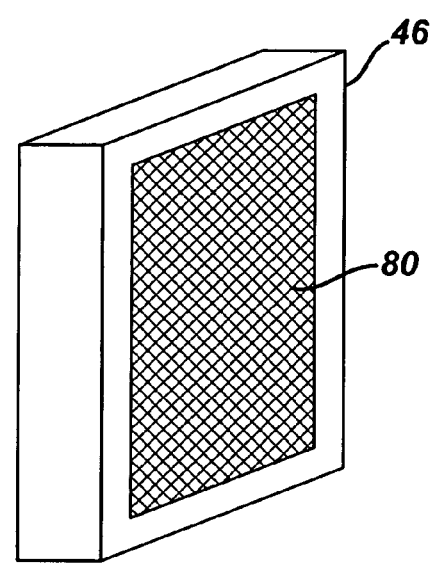
FIG. 10 is a perspective illustration of an embodiment of a support member having a screen.

For example, referring to FIG. 10, in some embodiments, support member 46 can include a screen or a mesh 80 extending across the support member and between fuel source 48 and the fuel cell. Screen 80 can restrict fuel source 48 from contacting, for example, the anode of the fuel cell.

Figure 11:
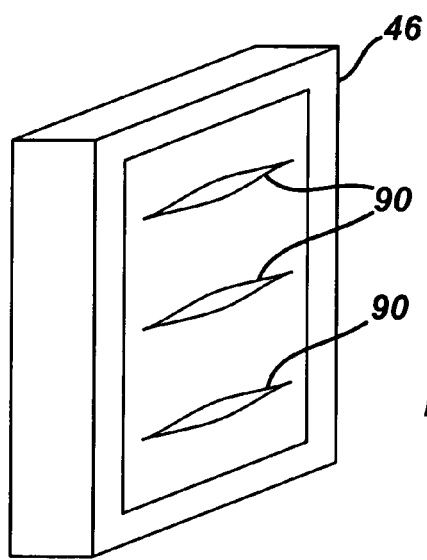
FIG. 11 is a perspective illustration of an embodiment of a support member having a restriction mechanism.

Alternatively or additionally, referring to FIG. 11, fuel system 24 can include one or more restrictive mechanisms that partially or completely reduce (e.g., isolate) fuel flow from the fuel system to the fuel cell when the fuel cell system is not in use. The restrictive mechanism can restrict fuel 52 from unwanted loss, and from accumulating in an anode chamber and migrating across electrolyte 40 to cause parasitic losses (thereby reducing runtime) and mixed potentials at cathode 38 (thereby reducing output power). An example of a restrictive mechanism is a pressure-sensitive valve 90 (as shown, a slit valve made from a polymer membrane) extending across the support member and between fuel source 48 and the fuel cell. The pressure-sensitive valve can automatically open when there is a pressure differential (e.g., from accumulated fuel vapor), and close when the pressure differential is eliminated (e.g., when the fuel is vented). Pressure-sensitive valves are described, for example, in U.S. Ser. No. 10/236,126, filed Sep. 6, 2002.

In some embodiments, fuel source 48 can be used without a support member.

The following examples are illustrative and not intended to be limiting.

EXAMPLE 1

This example illustrates fabrication of a liquid methanol fuel source and discharge within a vapor feed DMFC.

A fuel source or pocket was constructed using about 2.25 in$^2$ (14.5 cm$^2$) of 1-mil thick polyurethane from Deerfield Urethane, Inc of Whately, Mass. The sides of the square-shaped pocket were heat bonded on three sides using an Impulse Sealer (Type AIE-200 from American International Electric) filled with 2.26 g of neat methanol, and then closed by sealing the final edge.

Figure 12:
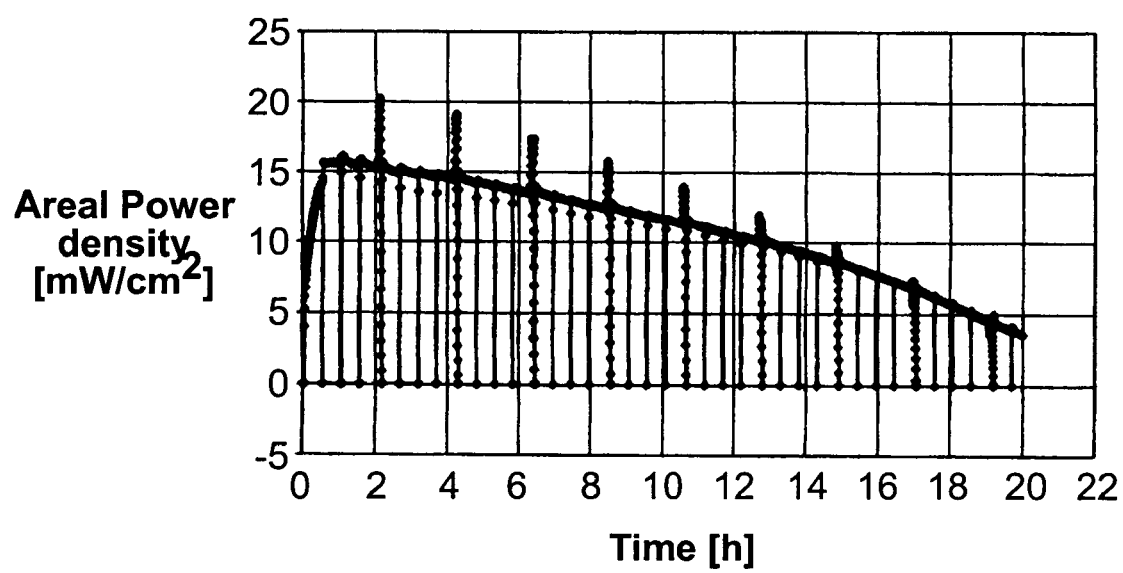
FIG. 12 is a discharge curve showing power density vs. time.

Next, the fuel pocket was placed in a single cell vapor feed DMFC, specifically within a closed cavity adjacent to the anode to allow the fuel vapors to reach the anode. The membrane electrode assembly of the cell included a Nafion® polyelectrolyte membrane (commercially available from E.I. DuPont de Nemours Company, Wilmington, Del.), a Pt/Ru anode, and a Pt cathode of 5 cm$^2$ electrode active area. The cell was subjected to 0.3V discharge with periodic sweeps to 0.18 V and then to open circuit. The fuel cell was run for 20 h in a "face up" orientation, that is, with the fuel pocket below the cell. Controlled ambient conditions were used in the run: 26° C. and 30% humidity. After completing the experiment, almost no liquid (<0.5 g) remained in the pocket. The pocket volume reduced substantially, conforming to the small amount of liquid remaining. This observation indicated the desirable rejection of gas into the fuel pocket. FIG. 12 shows the discharge curve (time vs. power density) over the 20 hr potentiostatic operation.

EXAMPLE 2

This example illustrates fabrication of a fuel source or pocket having a gelled methanol fuel.

Four distinct fuel pockets, each roughly 3.0×1.5 inches (4.5 in$^2$ or 290 cm$^2$), were heat bonded using an Impulse Sealer (Type AIE-200 from American International Electric) and filled with an unmeasured amount of pre-made gelled methanol. A 3.0×3.0 inch sheet of 1-mil thick polyurethane film from Deerfield Urethane, Inc. of Whately, Mass. was folded in half to form the 3×1.5 in rectangle and sealed on two edges to begin fabrication of the pocket. The pocket was sealed at the ends with two 1.5×1.5 inch panels. An unmeasured amount of pre-made gelled methanol fuel was placed through the open edge filling the pocket to capacity. (The gelled fuel consisted of approximately 1.66 wt % Carbopol EZ-3, 0.04% NaOH and 98.30 wt. % methanol.) The final edge of the pocket was sealed with care to minimize trapping of air. The height of the filled pockets were approximately 0.3 to 0.4 in when placed on a flat surface, spread, and leveled.

EXAMPLE 3

This example illustrates fabrication of a fuel source including substantially of non-fuel permeable material.

A semi-flexible cubic structure was heat sealed using an Impulse Sealer (Type AIE-200 from American International Electric) from two sheets of 5-mil thick polyethylene, a flexible, collapsible and substantially methanol impermeable material. Each flattened face of the resultant cube had dimensions of 1¾×1¾ inch.

In other embodiments, the cube can include a face cutaway for fuel vapor escape to a fuel cell anode. The cutaway section can be left open, or for orientation independence, be covered with fuel permeable membrane by heat or mechanically sealing the edges of the fuel permeable and fuel impermeable sections.

EXAMPLE 4

This example illustrates the mechanical robustness and seal integrity of a liquid methanol fuel pocket.

Two distinct fuel pockets were constructed using an Impulse Sealer (Type AIE-200 from American International Electric) and filled with an unmeasured amount of liquid methanol. Two roughly 4×3.0 inch sheets of 1-mil thick polyurethane film from Deerfield Urethane, Inc. of Whately, Mass. were each folded in half to form a 2×1.5 in rectangles and each sealed on two edges to begin fabrication of the pocket. The pocket was sealed at the ends with two 1.5×1.5 inch panels. An unmeasured amount of liquid methanol fuel was placed through the open edge filling each pocket to capacity. Held upright, the final edge of the pockets were pinched at the liquid level to minimize trapping of air and sealed. Lying on a flat surface, each liquid pocket self-leveled to a height of roughly 0.5 inches and an area of roughly 2×3 inches.

To verify seal integrity qualitatively, each pocket was rested upon dry tissue paper for duration on the order of seconds in several different orientations. Upon lift of each pocket, no trace of liquid was observed, indicating negligible leakage of methanol liquid from the pocket. Over time, the pocket reduced in size due to the permeation of methanol vapor from the membrane surface.

To verify mechanical robustness qualitatively, one of the pockets was dropped from a vertical distance of greater than 3 feet and re-tested for leaks by resting upon dry tissue. Again, upon lift of the pocket, no trace of liquid was observed indicating non-leakage of liquid methanol.

All references, such as patent applications, publications, and patents, referred to herein are incorporated by reference in their entirety.

Other embodiments are in the claims.

What is claimed is:

1. A fuel cell system, comprising:
   a fuel cell comprising an anode, a cathode, and an electrolyte; and
   a fuel source configured provide fuel in vapor form to the fuel cell, the fuel source comprising a collapsible housing, and a fuel selected from the group consisting of methanol, ethanol, and hydrocarbons within the housing, wherein the housing has an exterior surface area and includes a membrane that is permeable to the fuel in vapor form and that defines at least 25% of the exterior surface area of the housing, wherein during operation of the fuel cell system the fuel passes through the membrane in vapor form and is provided to the fuel cell, and wherein as the fuel in vapor form passes through the membrane the housing collapses.

2. The system of claim 1, wherein the material has a permeability to the fuel in vapor form of at least about 0.001 g/hr·cm$^2$.

3. The system of claim 1, wherein the material is selected from the group consisting of a fluorocarbon polymer, a modified polyethylene, a modified polypropylene, a polycarbonate, a polyimide, a polysulfone, a polysulfide, a polyurethane, a polyester, a polysilicone, poly(1-trimethylsilyl-1-propyne), and poly(4-methyl-2-pentene).

4. The system of claim 1, wherein the anode has a side positioned adjacent to the membrane, and wherein the membrane and the side have substantially corresponding surface areas.

5. The system of claim 1, wherein the membrane is impermeable to nitrogen and oxygen.

6. The system of claim 1, further comprising a pressure-sensitive valve, located between the housing and the fuel cell.

7. The system of claim 1, wherein the fuel comprises methanol in the form of a liquid.

8. The system of claim 1, wherein the fuel comprises methanol in the form of a gel.

9. The system of claim 1, further comprising a support configured to support the fuel source and to engage with the fuel cell.

10. A method of operating a fuel cell, comprising:
contacting an anode of the fuel cell with a fuel in vapor form selected from the group consisting of methanol, ethanol, and hydrocarbons from a housing having an exterior surface area and including a membrane that is permeable to the fuel and defines at least 25% of the exterior surface area of the housing, wherein fuel passes through the membrane in vapor form and is provided to the anode.

11. The method of claim 10, further comprising collapsing the housing during operation of the fuel cell.

12. The method of claim 11, further comprising collapsing the housing along a preferential folding portion.

13. The method of claim 10, further comprising venting pressure from the housing during operation of the fuel cell.

14. The system of claim 1, wherein the membrane comprises a plurality of layers.

15. The system of claim 14, wherein one layer of the membrane has a permeability to the fuel different than the permeability to the fuel of a second layer of the membrane.

16. The system of claim 14, wherein one layer of the membrane has a porosity different than the porosity of a second layer of the membrane.

17. The system of claim 1, wherein the membrane has a thickness of between 100 nanometers and 200 micrometers.

18. The system of claim 1, wherein the housing includes two of said membranes bonded together to define a cavity including the fuel.

19. The system of claim 1, wherein the housing is prismatic or cubic.

20. The system of claim 1, wherein the housing consists of the membrane.

21. The system of claim 1, wherein the housing includes one or more of the membranes that together define at least about 60% of the exterior surface area of the housing.

22. The system of claim 1, wherein the housing includes one or more of the membranes that together define at least about 80% of the exterior surface of the housing.

23. The system of claim 5, wherein the membrane also is impermeable to water and carbon dioxide.

* * * * *